United States Patent
Huang et al.

(10) Patent No.: US 9,705,759 B2
(45) Date of Patent: Jul. 11, 2017

(54) DATA LEAKAGE PROTECTION IN CLOUD APPLICATIONS

(75) Inventors: He Yuan Huang, Beijing (CN); Xiao Xi Liu, Beijing (CN); Qi Hu, Beijing (CN); Guan Qun Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 376 days.

(21) Appl. No.: 13/403,397

(22) Filed: Feb. 23, 2012

(65) Prior Publication Data

US 2012/0222110 A1 Aug. 30, 2012

(30) Foreign Application Priority Data

Feb. 28, 2011 (CN) .......................... 2011 1 0048050

(51) Int. Cl.
- H04L 29/06 (2006.01)
- H04L 12/26 (2006.01)
- H04W 4/00 (2009.01)

(52) U.S. Cl.
CPC ........ H04L 43/028 (2013.01); H04L 63/1408 (2013.01); H04W 4/003 (2013.01)

(58) Field of Classification Search
CPC ................................ H04L 43/08; H04L 43/00
USPC .......................................................... 726/22
See application file for complete search history.

(56) References Cited

U.S. PATENT DOCUMENTS

| | | |
|---|---|---|
| 7,660,902 B2 | 2/2010 | Graham et al. |
| 7,899,903 B2 * | 3/2011 | Sanghvi ................. G06F 11/30 709/221 |
| 2009/0300149 A1 * | 12/2009 | Ferris .................... G06F 15/177 709/222 |
| 2010/0115614 A1 | 5/2010 | Barile et al. |
| 2010/0162347 A1 | 6/2010 | Barile et al. |
| 2010/0186067 A1 | 7/2010 | Stephenson et al. |

(Continued)

FOREIGN PATENT DOCUMENTS

| | | |
|---|---|---|
| CN | 101273349 A | 9/2008 |
| CN | 101364984 A | 2/2009 |
| WO | 2010023477 A1 | 3/2010 |

OTHER PUBLICATIONS

Parno, B., et al., "CLAMP: practical prevention of large-scale data leaks," [online] In: Proc. of 2009 IEEE Symposium on Security and Privacy May 2009 [retrieved Feb. 23, 2012] retrieved from the Internet: <http://www.cs.cmu.edu/~dga/papers/clamp-oakland2009.pdf>, 16 pgs.

(Continued)

*Primary Examiner* — Jason K Gee

(74) *Attorney, Agent, or Firm* — Cuenot, Forsythe & Kim, LLC

(57) ABSTRACT

A computer-implemented method for data leakage protection is disclosed. A monitoring template corresponding to the cloud application is selected based upon communication between a user and a cloud application and from a plurality of monitoring templates. A monitor is generated using the selected monitoring template. Identifying information of content shared between the user and the cloud application is obtained using the generated monitor. Data about the shared content for security analysis is obtained according to the identifying information of the shared content.

20 Claims, 4 Drawing Sheets

(56) References Cited

U.S. PATENT DOCUMENTS

| | | | |
|---|---|---|---|
| 2010/0212010 A1* | 8/2010 | Stringer | G06F 21/52 |
| | | | 726/22 |
| 2011/0167469 A1* | 7/2011 | Letca | G06F 21/6218 |
| | | | 726/1 |
| 2012/0084436 A1* | 4/2012 | Pasternak | H04L 12/6418 |
| | | | 709/224 |

OTHER PUBLICATIONS

CN Published Appln. No. 102651737A, Published Aug. 29, 2012, Office Action, Apr. 1, 2014, 16 pg.

* cited by examiner

DATA LEAKAGE PROTECTION IN CLOUD APPLICATIONS

CROSS-REFERENCE TO RELATED APPLICATIONS

This application claims the benefit of China Application Number 201110048050.3 filed on Feb. 28, 2011, which is incorporated herein by reference in its entirety.

BACKGROUND

Field of the Invention

The present disclosure relates to data leakage protection, and more specifically, to a system for data leakage protection in cloud applications.

Description of the Related Art

With the popularization of electronic processing of information, the storage and transmission of data are becoming very convenient and speedy, but at the same time, this increases risks in data security. Particularly for most enterprises, the internet is making the boundary of an enterprise network and an external network fuzzier, and email and instant messengers closely connect the enterprise network to the external network. To protect the confidential and sensitive data of enterprises, many enterprises have employed data leakage protection techniques to ensure data security.

DLP (Data Leakage Protection) is a computer security term referring to systems that identify, monitor, and protect various data through deep content inspection and contextual security analysis on transaction data with a centralized management framework. Data to be protected may include data in use (e.g., endpoint actions), data in motion (e.g., network actions), and data at rest (e.g., data storage). DLP systems are generally designed to detect and prevent the unauthorized use and transmission of confidential information, especially focusing on the unintentional leakage of data.

Traditional DLP solutions can be mainly categorized into Desktop DLP solutions and Network DLP solution. Desktop DLP solutions run on end-user workstations or servers in the organization to provide interceptors to mainly monitor physical devices and I/O operations in OS level, for example, to monitor the writing to USB devices or CD/DVD, and the operations like cut, copy or print. Network DLP solutions have dedicated hardware/software platforms, typically installed on a company's Internet gateway, which analyze network traffic according to the protocols employed in the data transmission. However, in a widespread cloud scenario, traditional DLP solutions have many disadvantages.

In a cloud application scenario, the network providing computing resources is referred to as a "cloud." Generally speaking, the "cloud." is some virtual computing resources with the capacity of self-maintenance and self-management, and is usually a large-scale server cluster, including computing servers, storage servers, broadband resources, and the like. Cloud computing centralizes all computing resources, and manages them automatically by software, without the need of manual operation. From the perspective of users, the "cloud" contains unlimited resources, is accessible anytime, is usable when needed, and is extendable anytime. As a result of the above mentioned advantages associated with cloud computing, more and more enterprises and individuals and employing various cloud applications.

In a cloud application scenario, traditional DLP solutions have difficulties meeting the requirements of protecting data security. In particular, Desktop DLP solutions work on the underlying instructions of the operating system by monitoring the events on the operating system level. Not only does Desktop DLP solutions not deal with events on the application level, this particular solution does not capture and understand operations in cloud applications. Network DLP solutions focus on the data transmission on the network transport protocol level, and cannot acquire the contents that have been stored in the "cloud." Furthermore, traditional Network DLP do not provide intuitive interactions with users, which is a very important aspect for DLP.

To provide data leakage protection in cloud applications, an alternative solution may be proposed, which is to provide a unique DLP framework. In this solution, the cloud application providers would have to revise their own cloud applications and introduce the function of data protection into cloud applications. However, such a solution is highly dependent on the attention and expertise of cloud application providers on data security and, thus, cannot guarantee the reliability. In addition, as the enterprises have different data security strategies, constructing a unique DLP framework that is compatible with various DLP strategies on the market will be difficult. Therefore, such an alternative DLP solution would have difficulties in both practice and promotion.

BRIEF SUMMARY

A computer-implemented method for data leakage protection is disclosed. A monitoring template corresponding to the cloud application is selected based upon communication between a user and a cloud application and from a plurality of monitoring templates. A monitor is generated using the selected monitoring template. Identifying information of content shared between the user and the cloud application is obtained using the generated monitor. Data about the shared content for security analysis is obtained according to the identifying information of the shared content.

A computer hardware system for data leakage protection is disclosed. The system comprises at least one processor, and the at least one processor is configured to initiate and/or perform the following. A monitoring template corresponding to the cloud application is selected based upon communication between a user and a cloud application and from a plurality of monitoring templates. A monitor is generated using the selected monitoring template. Identifying information of content shared between the user and the cloud application is obtained using the generated monitor. Data about the shared content for security analysis is obtained according to the identifying information of the shared content.

A computer program product comprising a computer usable storage medium having stored therein computer usable program code for data leakage protection is disclosed. The computer usable program code, which when executed by a computer hardware system, causes the computer hardware system to perform the following. A monitoring template corresponding to the cloud application is selected based upon communication between a user and a cloud application and from a plurality of monitoring templates. A monitor is generated using the selected monitoring template. Identifying information of content shared between the user and the cloud application is obtained using the generated monitor. Data about the shared content for security analysis is obtained according to the identifying information of the shared content.

BRIEF DESCRIPTION OF THE SEVERAL VIEWS OF THE DRAWINGS

The invention may be better understood by combining the description referring to drawings below, in which the same or similar reference numbers represent the same or similar components throughout the drawings. The drawings are included within the description and constitute a part of the description along with the detailed description below, and are used to explain the preferred embodiments of the invention illustratively and illustrate the principal and advantage of the embodiments of the invention. In the drawings.

DETAILED DESCRIPTION

Figure 1:
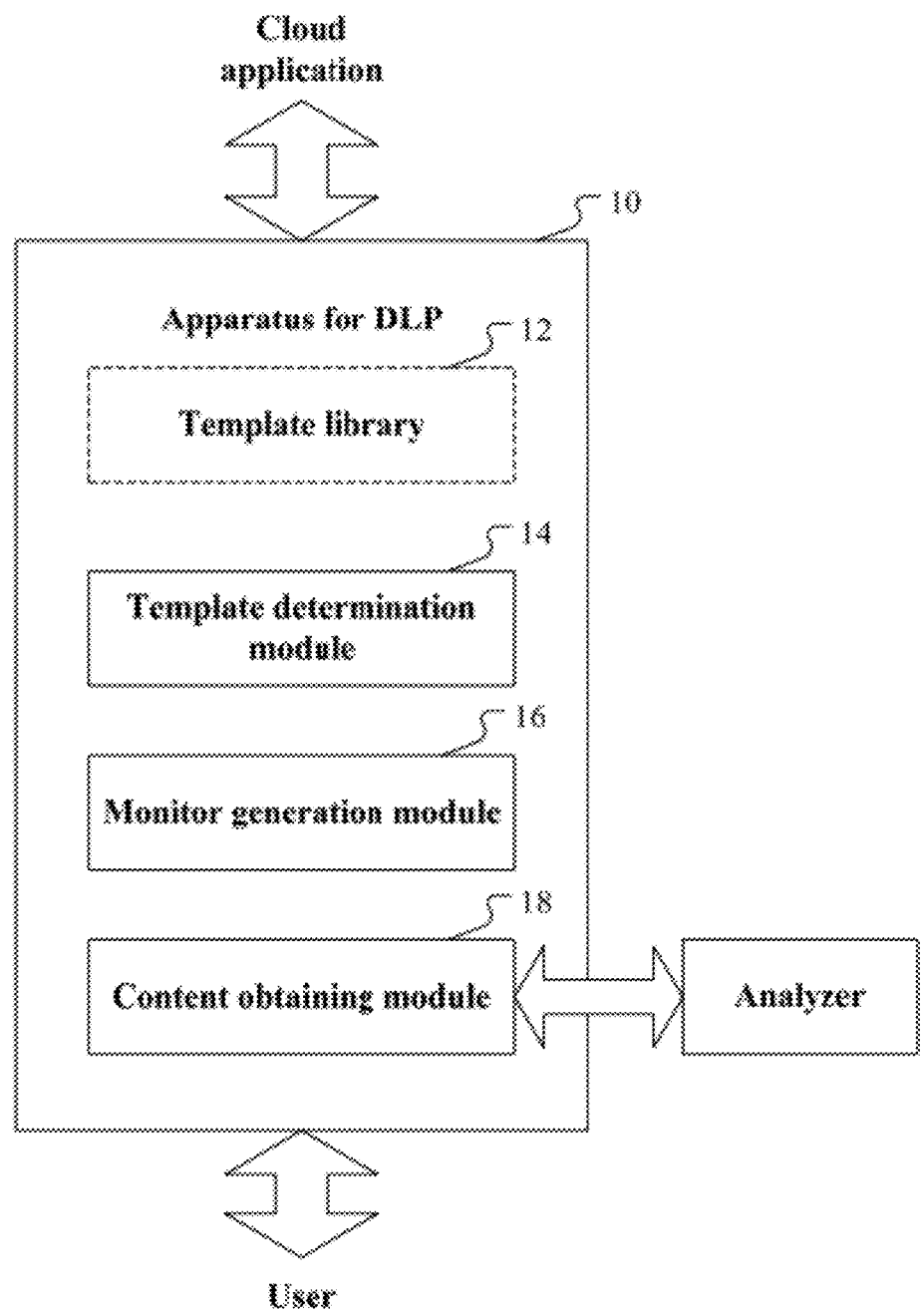
FIG. 1 is a block diagram showing an apparatus for data leakage protection.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain (or store) a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. Each block of the flowchart illustrations and/or block diagrams, and combinations of blocks in the flowchart illustrations and/or block diagrams, can be implemented using computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram showing an apparatus for data leakage protection according to an aspect of the invention. The apparatus 10 includes a template determination module 14, a monitor generation module 16, and a content obtaining module 18. The template determination module 14 is configured to select, according to the communication between a user and a cloud application, a monitoring template corresponding to the cloud application. The monitor generation module 16 is configured to generate a monitor by loading the selected monitoring template to obtain the identifying information of the shared content. The content obtaining module 18 is configured to obtain, according to the identifying information, the data of the shared content for security analysis.

As described above, the template determination module 14 and the monitor generation module 16, respectively, select and obtain the monitoring template corresponding to the cloud application and generate a monitor. The monitoring templates may be stored in a template library 12. In certain aspects, the template library 12 is also located in the apparatus 10 so as to facilitate the communication with other modules. In the illustrated example, the template library 12 is located in the apparatus 10. However, in other aspects, the template library may be located outside the apparatus 10, and the modules in the apparatus 10 may communicate with the template library by any known communication mode to obtain the templates contained therein.

The template library 12 is used to store monitoring templates corresponding to cloud applications. These templates may be specially designed and composed for various cloud applications by third parties and/or professionals who are familiar with the cloud applications. Being familiar with cloud applications, professionals would know the features of cloud applications, for example, the function points that a cloud application comprises, the page structures that the function points correspond to, the meaning of each field in the page structures, and the like. Accordingly, the monitoring template designed for the cloud application by professionals may comprise information and codes specially for monitoring interactions with the cloud application.

Generally, the monitoring template would first indicate the identifier of the cloud application (for example, the URL or http header of a cloud application) that the template is applicable for in its special section, such as identifying section or header. The monitoring template comprises monitor codes performing the monitoring function, and these codes can be in the form of Java Script. The monitor codes may specify the content of which fields in the related pages of the cloud application are to be monitored and recorded. In addition, the monitoring template may comprise explanatory codes, such as, codes for indicating where the above monitor codes should be inserted or loaded. Furthermore, based on the target cloud application, the monitoring template may comprise prescriptive codes relating to the storage of the content in the cloud application. Such codes may indicate how to obtain the content of interest from the cloud application. The detailed content of the monitoring template can be highly dependent on the target cloud application, and thus, for different cloud applications, the monitoring templates may have different forms and content.

In certain aspects, the templates in the template library 12 may be selectively added and deployed by the network administrator of an enterprise, depending on the cloud applications used in the enterprise. Based on the deployed monitoring templates, the monitor generation module 16 can generate appropriate monitors when needed to monitor and capture the operations of users in cloud application scenario.

Figure 2:
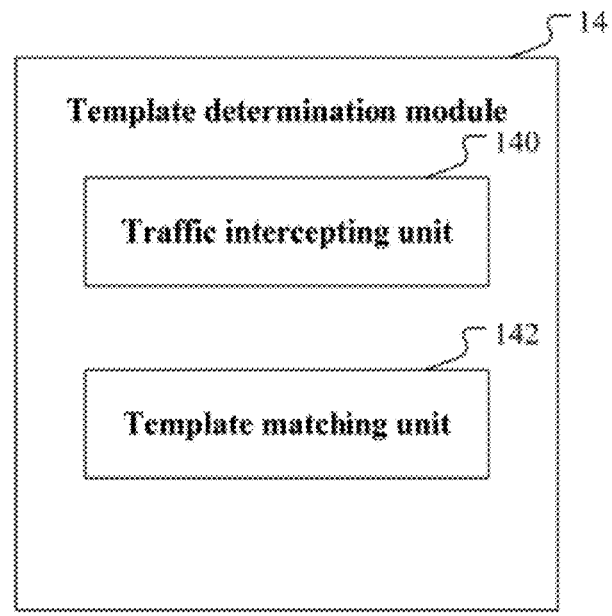
FIG. 2 is a structure diagram showing a template determination module.

The template determination module 14 selects, according to the communication between a user and a cloud application, the monitoring template corresponding to the cloud application. To this end, in certain aspects, the template determination module 14 includes logic for performing that above-identified functionality. FIG. 2 shows a template determination module 14 that includes a traffic intercepting unit 140 and a template matching unit 142.

The traffic intercepting unit 140 is configured to intercept the communication between users and cloud applications. When a user wants to access a cloud application, the user usually has to send an access request to the cloud application via a browser. This access request may possibly include the identifier of the cloud application to be accessed, such as URL, and the session information established for this access. As all the communications between users and external network are transmitted via the proxy server, this access request can be intercepted by the traffic intercepting unit 140 which is located in the proxy server. After obtaining this access request, the traffic intercepting unit 140 records the essential information in the access request which can identify the target cloud application, such as URL of the cloud application, the session information, etc, and then forwards this access request to the target cloud application.

Subsequently, the proxy server would receive a response to the access request returned from the cloud application. The traffic intercepting unit 140 intercepts the response, and selectively records the information relating to the identifier of the target cloud application, such as http header, specific parameters, etc. Then, the traffic intercepting unit 140 sends the recorded information for identifying the target cloud application to the template matching unit 142.

As described above, each template stored in the template library 12 records, in its identifying section, the identifier of the cloud application to which the template applies. Based on that information, the template matching unit 142 compares the obtained identifying information with the identifiers recorded in the identifying sections of the templates, finds the template with a matching identifier, and selects the template as the proper template for the target cloud application.

For different cloud applications, the identifying information that identifies the cloud application and its special function points can be different. In one example, the URL contained in the access request alone can identify the target cloud application. In this case, the template matching unit 142 can select the proper template by merely comparing URLs.

In another example, additional identifying information, such as the http header in the response from the cloud application, is used to select the proper template. In this case, the template matching unit 142 compares various kinds of identifying information successively with the designated information in the templates, thereby finding the proper template.

In yet another example, a cloud application comprises more than one function point, for example, the function of sending emails, the function of uploading files, the function of sharing files, and the like. Different function points correspond to different page information. Accordingly, the monitoring template for this cloud application comprises a plurality of sub-templates corresponding to the function points, and each sub-template indicates the identifier of the corresponding function point, for example, the features of the returned page information under this function. In this case, the template matching unit 142 further compares the obtained identifying information with the identifier of the function points so as to select the proper template for the current function point.

In order to select the proper template, the template matching unit 142 may compare parameters and information that are different from or not limited to those listed above, and that can be altered or adjusted according to the requirement of cloud applications and the corresponding templates.

Once the proper monitoring template is selected, the monitor generation module 16 generates a monitor by loading the selected template. The monitoring template can include monitor codes for realizing the monitoring function.

The monitor codes can include some code instructions for recording and capturing particular fields in the interactive pages between users and cloud applications, and those fields usually relate to the content to be shared by users. Consequently, according to the description in the monitoring template, the monitor generation module 16 loads the monitor codes to a proper location, such that the monitor codes can obtain the information relating to the content to be shared by capturing particular fields. For the security of sharing contents, one factor to be considered is whether the content to be shared relates to confidential information for the enterprise, and another possible factor to be considered is whether the sharing receiver has the permission to view the content to be shared. Therefore, the monitor codes usually monitor the shared content and (optionally) the sharing receivers. Next, the working procedure of the monitor generation module 16 and the generated monitor will be described in conjunction with detailed examples.

In one example, in response to a user's request, the cloud application returns an interactive response page to the user. The response page contains a form section to allow the user to fill out the items in the form, thereby indicating the content to be shared. Generally, the contents of different levels on the response page are organized in the format of a DOM tree. The items in the form correspond to special fields in the DOM structure. Accordingly, the monitoring template suitable for the cloud application may specify that the monitor codes should be loaded before the codes of the response page, wherein the monitor codes prescribe to record and capture the user's input in special fields of the DOM structure of the response page.

For the cloud application and the monitoring template mentioned above, according to the prescription of the monitoring template, the monitor generation module 16 inserts the monitor codes before the codes of the response page intercepted by the traffic intercepting unit 140, thereby adding a "wrapper" to the response page. The wrapper is used to record the contents of specified fields, thereby serving as a monitor. In some cases, the monitor codes also specify the events for triggering the monitoring action, for example, when the user performs a specific operation like clicking a "send" or "share" button. After adding the monitor codes, the monitor generation module 16 returns the revised response page to the user. The user inputs, in the form provided by the response page, the information relating to the content to be shared, for example, the information relating to the sharing receiver, the identifier of the content to be shared, and the like. By capturing the input in specified fields, the monitor can obtain the information relating to the content to be shared, which is input by the user.

In addition to the implementing mode where the monitor codes are inserted before the codes of the response page, the monitoring template may possibly prescribe other modes for loading the monitoring template, for example, depending on the structure of the response page of the cloud application, the monitor codes can be inserted at a particular location of the response page. In the implementing mode where the monitor codes are added to the response page, the monitor is dynamically generated in real time based on the receipt of the response page. Whenever sending a request to the cloud application and receiving a response page, the monitor generation module 16 would re-add the monitor codes and revise the response page according to the prescription of the template.

For a simple and single functional cloud application, however, it is possible to generate an independent monitor according to the monitoring template. After that, each time the cloud application is used, it is not necessary to generate a monitor once again, and what is needed is only to send the interactive page to the generated monitor for information extraction. Regardless of the way of being loaded and generated, the monitor is designed to monitor and extract the information in the fields of the shared contents in the interactive page. In certain aspects, the monitor also monitors the information relating to the sharing receivers.

As to the information relating to the sharing receivers, generally, by capturing the input in special fields, the monitor can directly obtain the identifying information of the sharing receiver, such as the email address and the registered ID of the receiver. As to the information relating to the shared contents, there are two situations where the contents are local or from the cloud.

In this example, the content to be shared is local. For example, in some email cloud applications, when composing a new email, the user may input the email address of a recipient in a special field of the response page, and designate a file to be attached in the attachment option. In this case, the attached file may be deemed as the shared content, and the recipient of the email may be deemed as the sharing receiver. The user identifies the file to be shared by the local path of the attached file. After the user has designated the file to be shared, generally, the file would be uploaded into the buffer in the proxy server, including the high-speed cache and the temporary buffer, for subsequently being forwarded to the cloud application.

In one case, when the monitor is triggered to capture the information of the file to be shared, the file has been uploaded to the high-speed cache of the proxy server. At this point, the high-speed cache assigns an ID to the uploaded file to identify it. Hence, the monitor may directly record the ID as the identifier of the shared content. In another case, when the monitor is triggered to capture the information of the file to be shared, the file has not been uploaded to the proxy server. In this case, the monitor first uploads the file to the temporary buffer of the proxy server according to the local path of the file. Similarly, the temporary buffer also assigns a temporary link or ID to the file. Hence, the monitor records the temporary link or ID as the identifier of the shared content.

In this example, the content to be shared is already located in cloud resources. For example, in the service of a web album, a user may share a picture or a file with other people. The picture or file to be shared has been beforehand stored in a cloud application, and the sharing operation of the user revises some permission settings to allow some people to have the permission to access the file to be shared. In this case, the cloud application has assigned a unique link to the file stored therein, and includes the link in the particular response page. As the monitor has been installed in the response page, the selection of a particular file by the user would trigger the monitor to extract the link corresponding to the selected file from special fields of the DOM structure of the page. Such a link may be served as the identifier of the content to be shared by the user.

The monitor generated by the above unit of the monitor generation module 16 only records the identifier of the content to be shared by the user, such as the ID in the cache, the link provided by the cloud application, etc, and does not record the data of the content to be shared. To perform security analysis on the shared content, obtaining complete and detailed data of the shared content is needed. To this end, the monitor provides the obtained identifier to the content obtaining module 18, and the content obtaining module 18 obtains the data of the content to be shared according to the identifier.

For the shared content that is locally stored, the content obtaining module 18 may obtain from the monitor the ID of the content to be shared in the high-speed cache or the temporary buffer of the proxy server, and request to access the cached data in the proxy server by the obtained ID. In most cases, however, the above ID alone is not sufficient to allow the data of the content to be read. Usually, the content obtaining module 18 should also obtain from the traffic intercepting unit 140 the session information between the user and the cloud application. Furthermore, in combination with the session information, the content obtaining module 18 can read the data of the content to be shared from the proxy server.

For the shared content that is stored in cloud, the content obtaining module 18 may obtain from the monitor the link address assigned to the content to be shared by the cloud application, and request to access the corresponding shared content in the cloud application by the obtained link address. Generally, since the user has set access permissions on the content stored in cloud, therefore, when the content obtaining module 18 requests to access a particular content in the cloud application, what has to be provided is not only the link address of the requested content, but also the interactive session information between the user and the cloud application. In addition, depending on the cloud applications, various information can be synthesized into a particular format to be recognized by the cloud applications.

Therefore, in certain aspects, the content obtaining module 18 refers to the monitoring template when obtaining the data of the content from cloud applications. As described above, depending on the target cloud applications, the monitoring template may possibly include the instructive codes relating to the storage of the content in a cloud application. Such codes can indicate how to obtain the desired content from the cloud application. By referring to the template, the content obtaining module 18 first collects the essential information for accessing the shared content, comprising, for example, the link address of the shared content, session ID, etc; and then according to the prescription in the template, it organizes these pieces of information into a particular format, thereby forming an access request. By such an access request, the content obtaining module 18 can read the data of the shared content from the cloud application.

After obtaining the data of the shared content, the content obtaining module 18 sends these data and optionally the information of the sharing receivers to an analyzer for security analysis. The security of the shared content is analyzed by using an independent analyzer because the security mentioned above is mainly dependent on the enterprise's security policies. Therefore, the analyzer is separate from the apparatus 10 in FIG. 1, and is designed and provided by enterprises according to their security requirements. Generally, by analyzing the data of the shared content, the analyzer can make the security judgment, for example, whether it relates to confidential information, whether it needs to be encrypted, and the like.

In certain aspects, the apparatus 10 in FIG. 1 further comprises an interaction module (not shown) for providing interactions with users. In particular, the interaction module obtains the result of judgment from the analyzer. If the result is that the content to be shared possibly relates to confidential information, the interaction module provides users with interactive options.

Figure 3A:
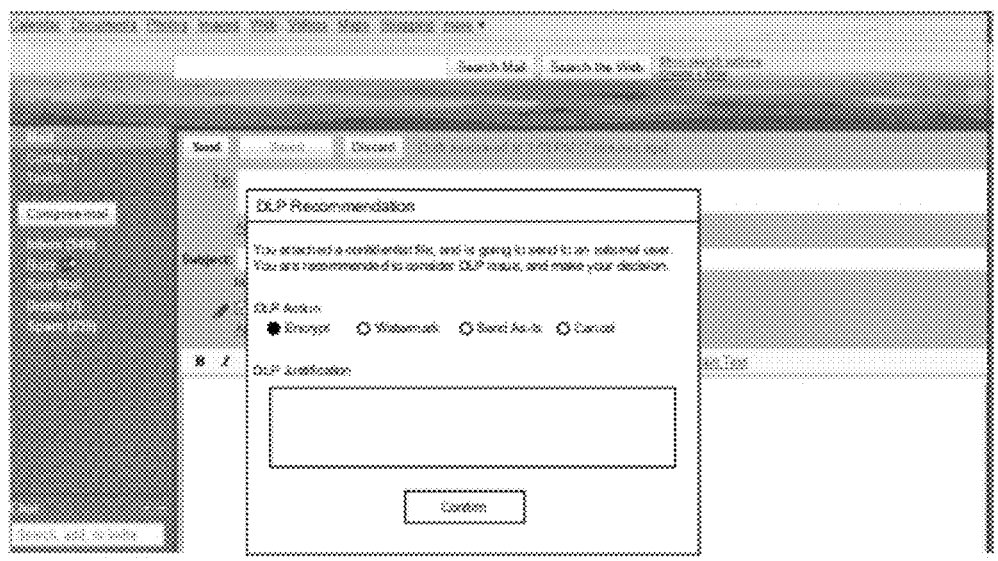
FIG. 3 is an example of interactive options.

FIG. 3 is an example of interactive options according to an embodiment of the invention. FIG. 3A shows the interactive options provided by the interaction module when the email-composing function of an email application is used. As illustrated, when analysis shows that a user is attempting to send a confidential content to an outsider, the interaction module may provide the user with a plurality of options, comprising encrypting the content to be sent, adding a watermark, sending as-is, canceling the operation, etc. The user may perform the next operation by choosing one of these options.

Figure 3B:
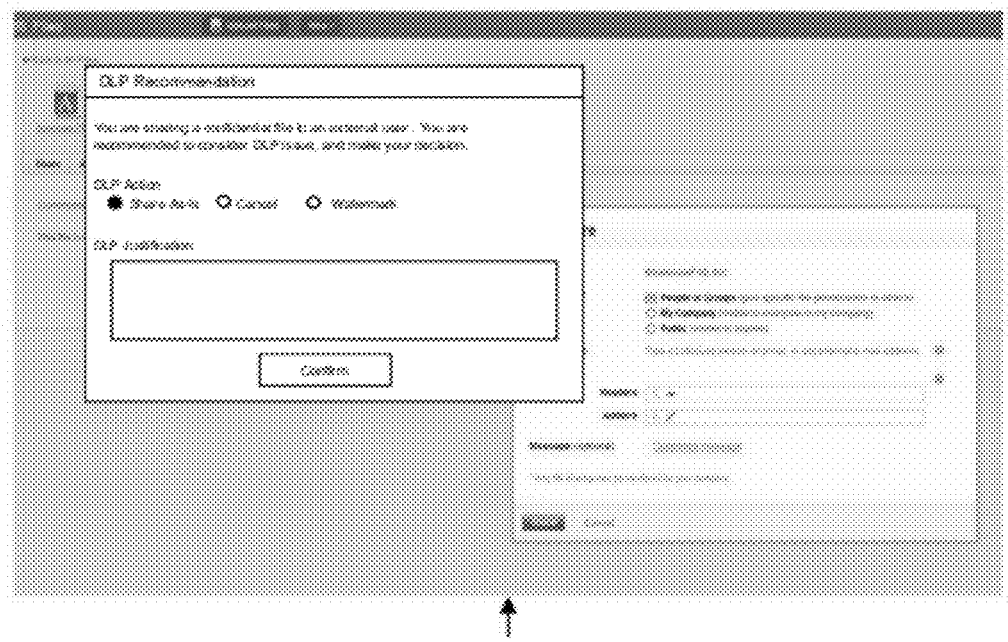

FIG. 3B shows the interactive options provided by the interaction module when the file-sharing function of a cloud application is used, comprising sharing as-is, canceling the operation, and adding a watermark. Therefore, the apparatus 10 can provide better interactions with users and, thus, provides a friendlier user experience.

Figure 4:
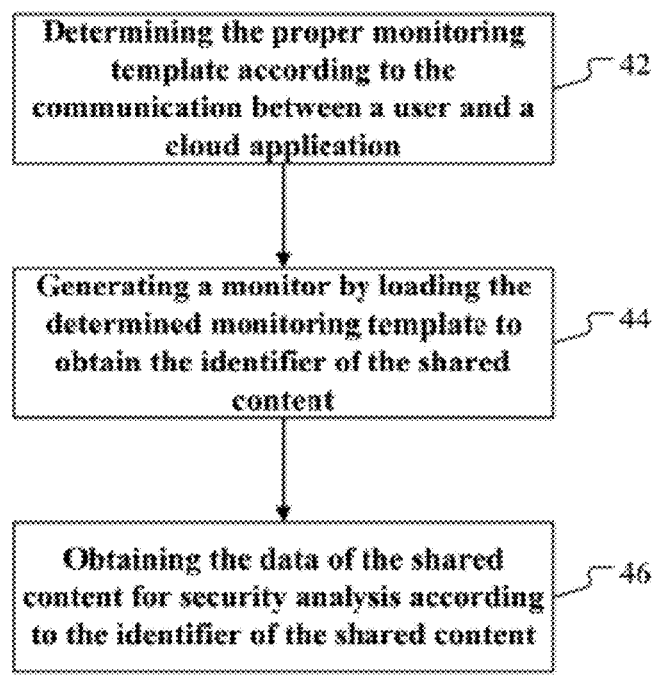
FIG. 4 is a flow chart showing a method.

In a cloud application scenario, the apparatus described above can generate specialized monitors by using the templates corresponding to cloud applications in order to monitor the identifiers of the contents to be shared by users, and thus obtain the data of the shared contents for further security analysis. FIG. 4 is a flow chart showing a method according to certain aspects. As illustrated, the method comprises steps 42, 44, and 46. In step 42 a selection is made, according to the communication between a user and a cloud application, the monitoring template corresponding to the cloud application. In step 44, a monitor is generated by loading the selected monitoring template so as to obtain the identifier information of the shared content. In step 46, the data of the shared content is obtained, according to the identifier information, for security analysis.

Figure 5:
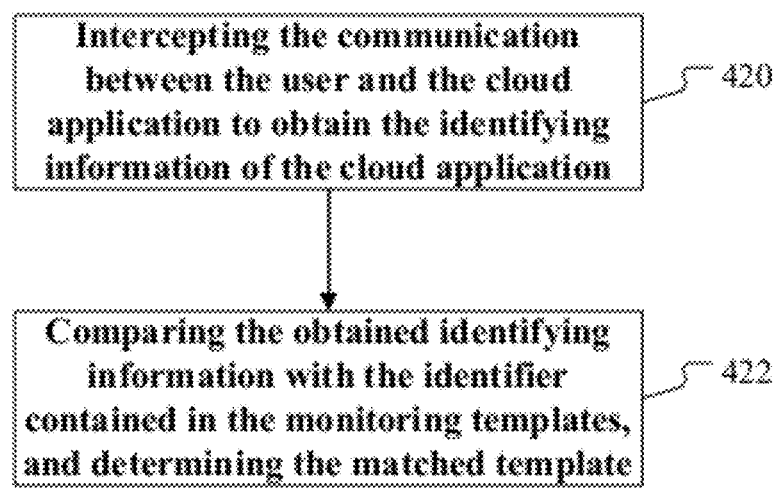
FIG. 5 shows the sub-steps of step 42 in FIG. 4.

In step 42, the monitoring template corresponding to the cloud application is selected as discussed above with regard to the template determination module 14. FIG. 5 shows the sub-steps of step 42. As illustrated, step 42 may include sub-steps 420 and 442. In sub-step 420, the communication between the user and the cloud application is intercepted, and the identifier information of the cloud application is obtained. In sub-step 422, the obtained identifier information is compared with the identifier information recorded in the monitoring templates to select the matched monitoring template.

The identifier information of the cloud application obtained in sub-step 420 may comprise the URL of the cloud application, the session information, the HTTP header of the response page, specific parameters, and the like. Each template stored in the template library indicates, in its identifying section, the identifier of the cloud application to which the template applies. In sub-step 422, the proper template for the cloud application can be selected by comparing the obtained identifier information with the identifiers recorded in the identifying sections of the templates.

Once the proper monitoring template is selected, a monitor can be generated by loading the selected monitoring template, as shown in step 44. According to the description in the monitoring template, the monitor codes may be loaded to a proper location thereby generating a monitor. As the monitor codes prescribe to capture the contents of special fields, the monitor can therefore obtain the information relating to the content to be shared for particular cloud application, including the information of the sharing receivers and the identifier of the shared content.

In the case that the content to be shared is locally stored, the monitor may capture the cache ID of the shared content in the buffer of the proxy server. In the case that the content to be shared is already in cloud resources, the monitor may extract the link of the shared content from special fields of the DOM structure of the page as its identifier.

Through steps 42 and 44, a specialized monitor may be generated for the cloud application, and allow the monitor to capture the identifier of the content to be shared. Furthermore, in step 46, according to the identifier thus obtained, the data of the content to be shared is obtained, and the data is sent to an analyzer for security analysis.

For shared content that is locally stored, in step 46, the cache ID of the shared content in the high-speed cache or the temporary buffer obtained from the monitor may be utilized to request access to data of the shared content in the proxy server. For the shared content which is stored in cloud, in step 46, the link address assigned to the shared content obtained from the monitor may be utilized to request access to the corresponding shared content in the cloud application.

In certain aspects, in step 46, to obtain the data of the shared content, more information is collected by referring to the prescriptions of the monitoring template, such as the session ID, and these pieces of information and the link address of the shared content are organized into a particular format to forming an access request. By using this access request, the data of the shared content may be read from the cloud application.

After obtaining the data of the shared content, in step 46, this data may be sent, together with the information of the sharing receivers, to an analyzer for security analysis. After obtaining the result of judgment from the security analysis, the method can provide interactions with users according to the result of judgment. In particular, if the result of judgment shows that the content to be shared possibly relates to confidential information, the interaction step provides users with several interactive options including, for example, encrypting the content to be sent, adding a watermark, sending as-is, canceling the operation, etc. The user may perform the next operation by choosing one of these options.

In a cloud application scenario, the method can generate specialized monitors for cloud applications in order to monitor the identifiers of the contents to be shared by users, and thus obtain the data of the shared contents for further security analysis, thereby providing the function of data leakage protection. Additionally, a proxy server includes a processor and a storage connected with the processor. The storage may be used to store the codes and instructions for implementing the apparatus and method described above, and the processor may be used to execute the codes and instructions to generate the monitors in order to capture the data of the content to be shared.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method within a data leakage protection hardware system positioned separate from and between a client and a cloud application, comprising:
   receiving, from the client, a communication between the client and the cloud application;
   selecting, from a plurality of monitoring templates and based upon the communication, a monitoring template corresponding to the cloud application;
   receiving, from the cloud application, a response to the communication;
   generating, using the selected monitoring template, a monitor;
   revising the received response to include the monitor; and
   forwarding the revised response to the client.

2. The method of claim 1, wherein
   the monitor includes monitor codes configured to record input of shared content into a predetermined field within the response.

3. The method of claim 2, wherein
   the monitor code is configured to be loaded by the client before codes contained in the received response.

4. The method of claim 2, wherein
   the monitor codes are configured to perform an action based upon a specified event.

5. The method of claim 4, wherein
   the specified event is an initiation of an operation to communicate the shared content.

6. The method of claim 4, wherein
   the action includes at least one of
     encrypting a sharing file,
     adding a watermark to the sharing file, and
     canceling an operation associated with the specified event.

7. The method of claim 1, wherein
   the monitor is configured to:
     capture an identifier of shared content, and
     communicate the identifier of the shared content to an analyzer separate from the data leakage protection hardware system.

8. The method of claim 1, wherein
the analyzer is associated with an enterprise within which the client operates.

9. A data leakage protection hardware system positioned separate from and between a client and a cloud application, comprising:
a computer hardware processor configured to initiate the following operations:
receiving, from the client, a communication between the client and the cloud application;
selecting, from a plurality of monitoring templates and based upon the communication, a monitoring template corresponding to the cloud application;
receiving, from the cloud application, a response to the communication;
generating, using the selected monitoring template, a monitor;
revising the received response to include the monitor; and
forwarding the revised response to the client.

10. The data leakage protection hardware system of claim 9, wherein
the monitor includes monitor codes configured to record input of shared content into a predetermined field within the response.

11. The data leakage protection hardware system of claim 10, wherein
the monitor code is configured to be loaded by the client before codes contained in the received response.

12. The data leakage protection hardware system of claim 10, wherein
the monitor codes are configured to perform an action based upon a specified event.

13. The data leakage protection hardware system of claim 9, wherein
the monitor is configured to:
capture an identifier of shared content, and
communicate the identifier of the shared content to an analyzer separate from the data leakage protection hardware system.

14. The data leakage protection hardware system of claim 9, wherein
the analyzer is associated with an enterprise within which the client operates.

15. A computer program product, comprising
a computer usable hardware storage device having computer usable program code stored therein,
the computer usable program code, which when executed by a data leakage protection hardware system positioned separate from and between a client and a cloud application, causes the data leakage protection hardware system to perform:
receiving, from the client, a communication between the client and the cloud application;
selecting, from a plurality of monitoring templates and based upon the communication, a monitoring template corresponding to the cloud application;
receiving, from the cloud application, a response to the communication;
generating, using the selected monitoring template, a monitor;
revising the received response to include the monitor; and
forwarding the revised response to the client.

16. The computer program product of claim 15, wherein
the monitor includes monitor codes configured to record input of shared content into a predetermined field within the response.

17. The computer program product of claim 16, wherein
the monitor code is configured to be loaded by the client before codes contained in the received response.

18. The computer program product of claim 16, wherein
the monitor codes are configured to perform an action based upon a specified event.

19. The computer program product of claim 15, wherein
the monitor is configured to:
capture an identifier of shared content, and
communicate the identifier of the shared content to an analyzer separate from the data leakage protection hardware system.

20. The computer program product of claim 15, wherein
the analyzer is associated with an enterprise within which the client operates.

* * * * *